US008752029B2

(12) United States Patent
Gulwani et al.

(10) Patent No.: US 8,752,029 B2
(45) Date of Patent: Jun. 10, 2014

(54) COMPUTING A SYMBOLIC BOUND FOR A PROCEDURE

(75) Inventors: Sumit Gulwani, Redmond, WA (US); Florian Franz Zuleger, Aying (DE); Sudeep Dilip Juvekar, Berkeley, CA (US)

(73) Assignee: Microsoft Corporation, Redmond, WA (US)

( * ) Notice: Subject to any disclaimer, the term of this patent is extended or adjusted under 35 U.S.C. 154(b) by 852 days.

(21) Appl. No.: 12/568,710

(22) Filed: Sep. 29, 2009

(65) Prior Publication Data

US 2011/0078665 A1 Mar. 31, 2011

(51) Int. Cl.
*G06F 9/44* (2006.01)

(52) U.S. Cl.
USPC .......................................... 717/131

(58) Field of Classification Search
CPC .............. G06F 11/30–11/302; G06F 11/3466; G06F 11/3604
USPC .......................................... 717/131
See application file for complete search history.

(56) References Cited

U.S. PATENT DOCUMENTS

| 5,161,216 | A | | 11/1992 | Reps et al. |
| 5,459,739 | A | * | 10/1995 | Handley et al. ............... 714/797 |
| 6,029,002 | A | | 2/2000 | Afifi et al. |
| 6,499,132 | B1 | * | 12/2002 | Morley et al. ................. 716/103 |
| 8,286,137 | B2 | * | 10/2012 | Kahlon et al. ................ 717/126 |
| 2005/0229044 | A1 | * | 10/2005 | Ball ................................ 714/38 |
| 2006/0048122 | A1 | * | 3/2006 | Barton et al. ................. 717/160 |
| 2007/0245329 | A1 | * | 10/2007 | Sankaranarayanan et al. ............................. 717/151 |
| 2008/0216051 | A1 | * | 9/2008 | Johnson et al. ............... 717/110 |
| 2009/0326907 | A1 | * | 12/2009 | Gulwani et al. ................. 703/22 |
| 2010/0318980 | A1 | * | 12/2010 | Gulwani et al. ............... 717/160 |

OTHER PUBLICATIONS

Gulwani et al. "Control-flow Refinement and Progress Invariants for Bound Analysis", ACM, Jun. 15-20, 2009.*
Engblom et al. "FacilitatingWorst-Case Execution Times Analysis for Optimized Code", Uppsala University, Jun. 17-19, 1998.*
Ferdinand, "Worst Case Execution Time Prediction by Static Program Analysis", IEEE, 2004.*
Gustafsson et al. "Automatic Derivation of Loop Bounds and Infeasible Paths for WCET Analysis using Abstract Execution", IEEE, 2006.*
Rugina, "Symbolic Bounds Analysis of Pointers, Array Indices, and Accessed Memory Regions", vol. 27, No. 2, Mar. 2005, pp. 185-235., ACM.*

(Continued)

*Primary Examiner* — Wei Zhen
*Assistant Examiner* — Junchun Wu
(74) *Attorney, Agent, or Firm* — Dan Choi; Carole Boelitz; Micky Minhas (57) ABSTRACT

A system that facilitates computing a symbolic bound with respect to a procedure that is executable by a processor on a computing device is described herein. The system includes a transition system generator component that receives the procedure and computes a disjunctive transition system for a control location in the procedure. A compute bound component computes a bound for the transition system, wherein the bound is expressed in terms of inputs to the transition system. The system further includes a translator component that translates the bound computed by the compute bound component such that the bound is expressed in terms of inputs to the procedure.

20 Claims, 7 Drawing Sheets

(56) References Cited

OTHER PUBLICATIONS

Bultan et al. "Model Checking Concurrent Systems with Unbounded Integer Variables_Symbolic Representations_Approximations and Experimental Results", 1997, University of Maryland.*

Gulwani, "Speed: Symbolic Complexity Bound Analysis", 2009, pp. 51-62, Springer-Verlag.*

Ivanicici, et al. "Model Checking C Programs Using F-Soft", <<http://ieeexplore.ieee.org/stamp/stamp.jsp?tp=&arnumber=1524168&isnumber=32585>> Oct. 2-5, 2005, pp. 1-12.

Gulwani, et al. "Control-flow Refinement and Progress Invariants for Bound Analysis", PLDI '09, Jun. 15-20, 2009, Dublin, Ireland, pp. 11.

Beletska, et al. "Finding Synchronization-free Slices of Operations in Arbitrarily Nested Loops" <<http://www-rocq.inria.fr/who/Anna.Beletska/Papers/ICCSA2008.pdf>> vol. 5073, 2008, pp. 16.

Gulwani Sumit, "Speed: Symbolic Complexity Bound Analysis", <<http://research.microsoft.com/en-us/um/people/sumitg/pubs/cav09_speed.pdf>> Jun. 2009, vol. 5643, pp. 12.

* cited by examiner

COMPUTING A SYMBOLIC BOUND FOR A PROCEDURE

BACKGROUND

Due to advances in technologies, including advances pertaining to memory, processing capabilities, storage capacity, amongst others, computers have evolved from relatively high cost, low function machines to relatively low cost machines that can perform a variety of functions, including but not limited to complex mathematical computation, detailed graphics rendering, web browsing, etc. Furthermore, portable computing devices exist that allow many of the aforementioned functions to be executed on a portable device, such as mobile telephones and/or multimedia players. Additionally, computing devices have been deployed in a variety of contexts, such as in airplanes where real-time processing of sensor data is utilized to aid in maintaining control of an airplane, in automobile navigation systems to display a current location to an operator of the automobile, etc.

Programs executing on computing devices use physical resources of such computing devices, such as memory, processing time, power of a device, bandwidth on a network, etc. In many devices and/or contexts, the physical resources of a computing device are limited and/or are desirably closely monitored. For example, in real-time systems, it is desirable to bound the worst-case execution time of a program. In a program that is to be executed on a low power device or in a low bandwidth environment, it is desirable to bound the amount of power and/or bandwidth utilized by the computing device when executing the program. Estimating such resource bounds can be undertaken by determining the number of times one or more control locations inside a program that consumes these resources are executed.

Program execution can also affect certain quantitative properties of data upon which the program operates. For instance, the amount of secret leaked by a program can depend upon the number of times that a certain operation that leaks data is executed (e.g., by either direct or indirect information flow). Additionally, an amount of perturbation in output data values resulting from a relatively small perturbation or uncertainty in input values can depend upon the number of times additive error propagation operators are applied. Estimating such quantitative properties can be undertaken by determining the number of times one or more control locations inside a program that perform certain operations are executed.

Conventional approaches for ascertaining the number of times that a control location executes in a program are relatively imprecise and conservative in nature. An example approach for computing symbolic bounds on the number of times a control location executes in a program is to estimate a bound on a closest enclosing loop using techniques for loop bound computation. Again, however, this approach tends to be conservative and imprecise.

SUMMARY

The following is a brief summary of subject matter that is described in greater detail herein. This summary is not intended to be limiting as to the scope of the claims.

Described herein are various technologies pertaining to computing symbolic bounds on physical resources utilized by a program executing on a computing device. For example, various cost metrics can be utilized in connection with computing the symbolic bounds, including but not limited to cost metrics pertaining to memory instructions, cost metrics pertaining to allocation instructions (memory space bounds), and/or cost metrics pertaining to network instructions (network traffic bounds). The aforementioned symbolic bounds can be used in connection with providing feedback pertaining to code development, performance analysis, establishing space bounds in embedded systems, amongst other applications. Also described herein are various technologies pertaining to bounding the amount of secret leaked by a program at a certain control location in a program as well as bounding the amount of perturbation in output values with respect to a certain control location in a program.

In particular, described herein are various technologies for computing a worst-case symbolic bound on the number of visits to a certain control location in a procedure (e.g., a computer program) for any execution of such procedure on a computing device. The worst case symbolic bound can be defined as follows: an integer-valued function $\mathcal{B}(\vec{n})$ is a worst-case symbolic bound for a control location $\pi$ inside a procedure P with inputs $\vec{n}$ if for any input state $\vec{n}_0$ the number of times $\pi$ is visited is at most $\mathcal{B}(\vec{n}_0)$.

To determine a worst case symbolic bound for a given control location, a plurality of acts can be undertaken. For example, a disjunctive transition system T for the control location $\pi$ can be computed, wherein the disjunctive transition system T describes how variables in the procedure at $\pi$ are updated in an immediately subsequent visit to the control location $\pi$. A bound $\mathcal{B}$ may then be computed for the transition system T, and the bound on the number of visits to $\pi$ can be set as $1+\mathcal{B}$. The bound $\mathcal{B}$ can be expressed in terms of inputs to the transition-system T, which may or may not be the inputs to the procedure. Thus, the bound $\mathcal{B}$ can be translated at $\pi$ in terms of the inputs to the procedure. For example, such translation can be undertaken through employment of invariants (computed from an invariant generation tool) that relates procedure inputs with inputs to the transition system T. In another example, a backward symbolic engine can be used to express inputs to the transition system T in terms of the procedure inputs.

Other aspects will be appreciated upon reading and understanding the attached figures and description.

DETAILED DESCRIPTION

Various technologies pertaining to computing a reachability bound with respect to a certain control location in a program will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

Figure 1:
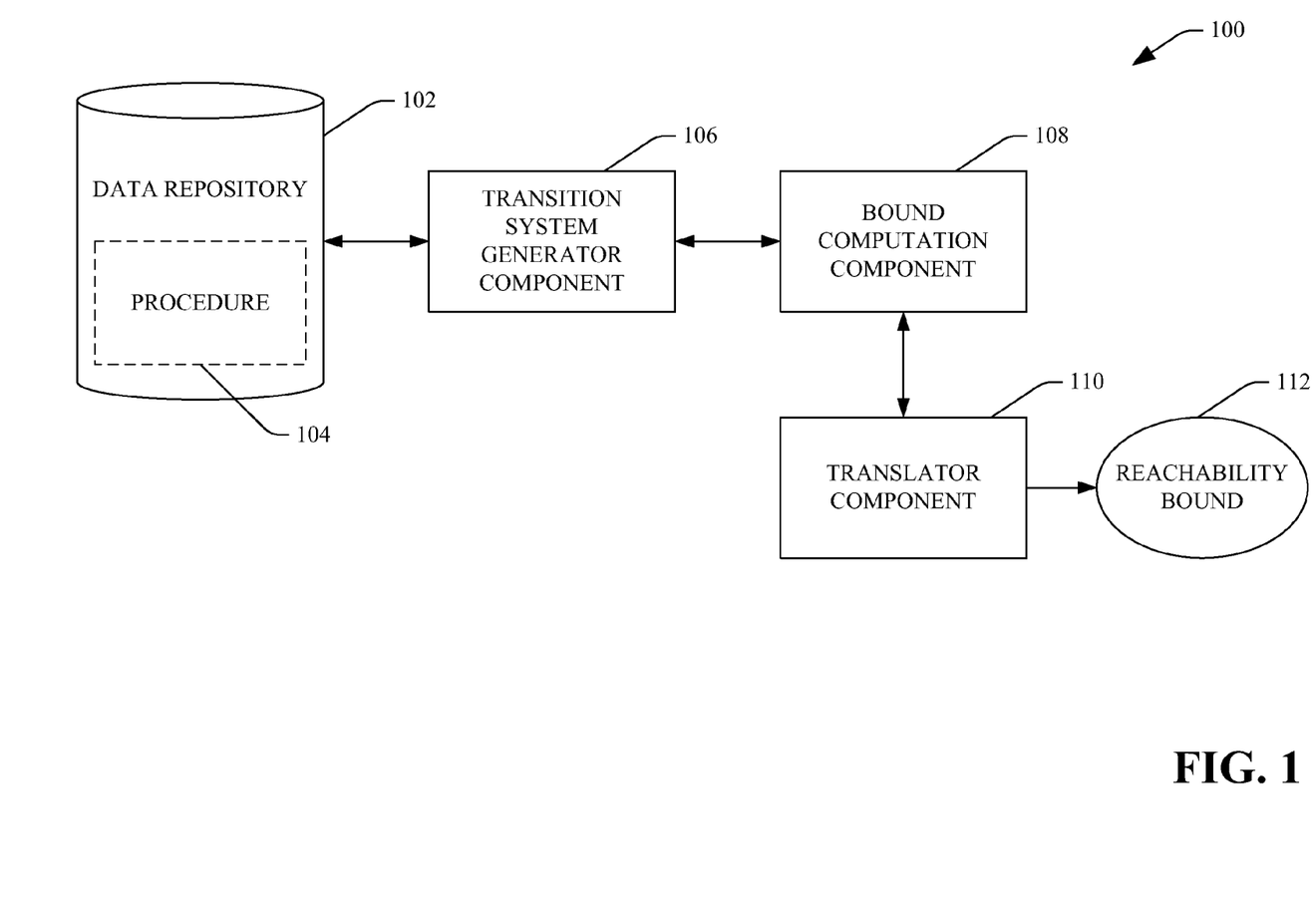
FIG. 1 is a functional block diagram of an example system that facilitates computing a reachability bound for a procedure.

With reference to FIG. 1, an example system 100 that facilitates computing a reachability bound for a certain control location in a procedure is illustrated. Computing the reachability bound pertains to computing a worst-case symbolic bound $\mathcal{B}(\vec{n})$ on the number of visits to a certain control location $\pi$ in a procedure P for any execution of P. The worst-case symbolic bound $\mathcal{B}(\vec{n})$ can be defined as follows: an integer-valued function $\mathcal{B}(\vec{n})$ is a worst-case symbolic bound for a control location $\pi$ inside a procedure P with inputs $\vec{n}$ if for any input state $\vec{n}_0$ the number of times $\pi$ is visited is at most $\mathcal{B}(\vec{n}_0)$.

It is to be understood that there may be multiple worst-case symbolic bounds for a certain control location, and it is desirable that the system 100 computes a bound that is precise in the sense that there exists a family $\phi(\vec{n})$ of worst case inputs that exhibit the worst-case bound (up to some constant factor). This notion can be defined as follows: a worst-case symbolic bound $\mathcal{B}(\vec{n})$ for a control location $\pi$ inside a procedure P with inputs $\vec{n}$ is precise (up to multiplicative constant factors) if there exists positive integers $c_1$, $c_2$, and $c_3$ and a formula $\phi(\vec{n})$ such that: 1) for any assignment $\vec{n}_0$ to variables $\vec{n}$ such that $\phi(\vec{n}_0)$ holds, the number of times control location $\pi$ is visited (when procedure P is executed in the input state $\vec{n}_0$) is at least $$\frac{\mathcal{B}(\vec{n}_0)}{c_1} - c_2;$$

and 2) for any integer k, there exists a satisfying assignment $\vec{n}_1$ for $\phi(\vec{n})$ such that $\mathcal{B}(\vec{n}_1) \geq k$. In other words, the formula $\exists \vec{n} : (\mathcal{B}(\vec{n}) \geq k \wedge \phi(\vec{n}))$ has a satisfying assignment.

The reachability bound computed by the system 100 can pertain to physical resources of a computing device, such as a bound on memory space utilized by a procedure (program) when executing on a computing device, a bound on time required to execute the procedure on a computing device, a bound on an amount of bandwidth consumed when executing the procedure on a computing device, an amount of power consumed by a computing device when executing the procedure, amongst other physical resources. The reachability bound computed by the system 100 may also be employed in connection with determining a bound on uncertainity propagation or secret leakage by some portion of a procedure. The system 100 can be utilized in connection with computing symbolic complexity bounds of procedures in terms of inputs (assuming unit cost for statements). Different cost metrics can be utilized when computing such symbolic complexity bounds, including count of memory instructions, count of memory allocation instructions (space bounds), count of network instructions (network traffic bounds), amongst others.

The system 100 includes a data repository 102 that comprises a procedure 104. The data repository 102 may be any suitable type of repository that can retain data, including but not limited to a hard drive, memory (such as ROM, RAM, EEPROM, amongst others), a flash drive, or other suitable repository. Additionally, the procedure 104 may be a plurality of computer-executable acts, such as code that includes a loop, a nested loop, code that includes a program or portion thereof, a portion of code utilized in an application program interface, or other suitable procedure.

A transition system generator component 106 can access the data repository 102 and retrieve/receive the procedure 104. For example, the transition system generator component 106 can access the data repository 102 upon receipt of a command from a user, upon a predefined event occurring on a computing device, or in response to some other event. The transition system generator component 106 can compute a disjunctive transition system T for the control location 7T, wherein the transition system T describes how the variables at 7T get updated in an immediately subsequent visit to the control location 7T. An example algorithm for generating the disjunctive transition system T that can be used by the transition system generator component 106 is described in greater detail below.

The system 100 may also optionally include a bound computation component 108 that is in communication with the transition system generator component 106. For example, the transition system generator component 106 and the bound computation component 108 can have access to a substantially similar portion of memory of a computing device (e.g., the transition system generator component 106 can cause the computed disjunctive transition system T to be stored in a portion of memory, and the bound computation component 108 can access such portion of memory). The bound computation component 108 can compute a bound $\mathcal{B}$ for the transition system T. For instance, the bound computation component 108, as will be described in greater detail below, can utilize pattern recognition techniques in connection with computing ranking functions of individual transitions pertaining to the transition system T, and such ranking functions can be utilized in connection with computing the bound. A bound on the number of visits to $\pi$ may be given by $1 + \mathcal{B}$.

The system 100 may also optionally include a translator component 110 that is in communication with the bound computation component 108. The bound $\mathcal{B}$ computed by the bound computation component 108 may be expressed in terms of inputs to the transition system T, which may or may not be inputs to the procedure P. The translator component 110 can translate the bound $\mathcal{B}$ at the control location $\pi$ in terms of inputs to the procedure P. In an example, the translator component 110 may use invariants (computed from an invariant generation tool) that relate the procedure inputs with the inputs to the transition system T. In another example, the translator component 110 may be or include a backward symbolic engine that expresses the transition system inputs in terms of the procedure inputs.

The translator component 110 can be implemented as a (goal-directed) backward analysis algorithm built on top of an SMT solver. The analysis algorithm can deal with arbitrary operators that are understood by the underlying SMT solver.

The analysis algorithm can also employ a proof-rule based non-iterative approach to reason about updates inside loops (therefore facilitating scalability). The proof-rule based technique can capture a common design pattern, wherein numerical variables that are updated inside loops either increase monotonically or decrease monotonically. Such a design pattern can be automatically identified by making an SMT (SAT modulo theory) query. Under such a design pattern, a value of the variable before and after the loop can be related using the number of visits to control locations where the variable is updated inside loops. The number of such visits can be recursively computed as described herein.

The output of the translator component 110 is a reachability bound 112 for the control location π in the procedure P as a function of inputs to the procedure P. As indicated above, the reachability bound 112 may be indicative of the number of times the control location it is visited during execution of the procedure P, and thus may be indicative of a bound pertaining to memory usage of the procedure P, power consumption of a device that executes the procedure P, processor time required to execute the procedure P, bandwidth of a network utilized when executing the procedure P, data perturbation corresponding to the control location π, amongst other bound data.

Figure 2:
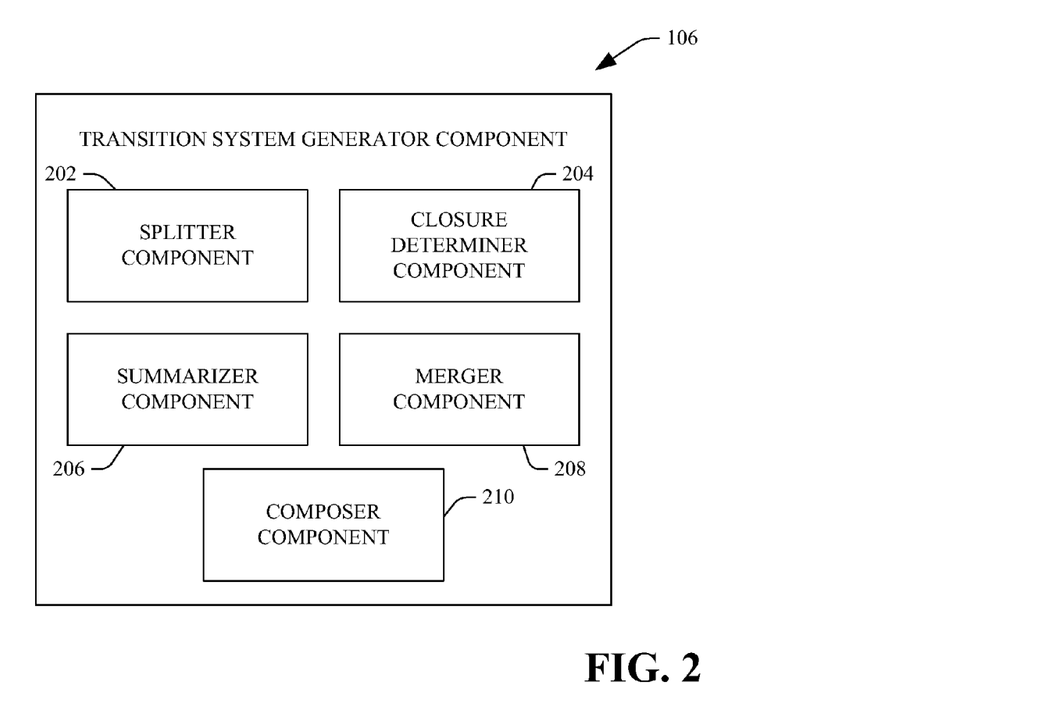
FIG. 2 is an example depiction of a component that facilitates generating a transition system with respect to a control location in a procedure.

Now referring to FIG. 2, an example depiction of the transition system generator component 106 is illustrated. As noted above, the transition system generator component 106 can compute a disjunctive transition system T for the control location π that describes how the variables at π get updated at an immediately subsequent visit to π when the procedure P is executed by a computing device. A transition system T that is computable by the transition system generator component 106 can be defined as follows: if $\vec{x}$ is a tuple of variables that are live at π, then a transition system for π is a relation $T(\vec{x}, \vec{x}')$ between variables $\vec{x}$ and their primed counterparts $\vec{x}'$ such that if $\vec{x}$ take values $\vec{v_1}$ and $\vec{v_2}$ during any two immediately successive/consecutive visits to π, then $T(\vec{v_1},\vec{v_2})$ holds. Additionally, a transition system computed by the transition system generator component 106 can be represented as a disjunction of transitions s, where each transition is a conjunctive relation over variables $\vec{x}$ and $\vec{x}'$.

Figure 3:
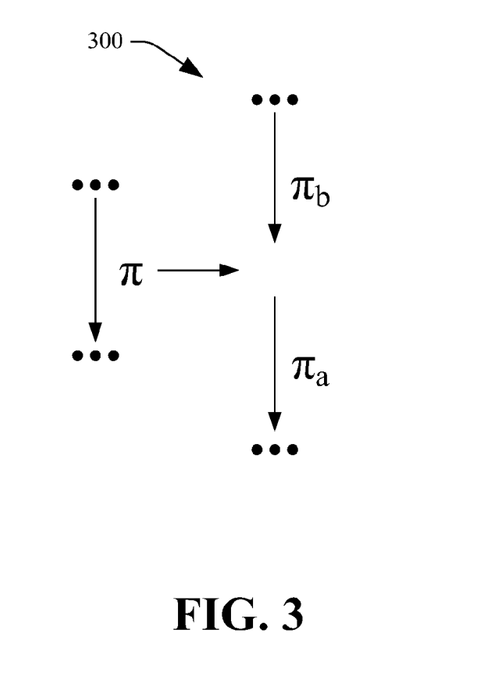
FIG. 3 is a graphical depiction of an example splitting of a control location into two locations.

The transition system generator component 106 includes a splitter component 202 that receives the procedure P and splits the control location π into two locations $π_a$ and $π_b$. The splitter component 202 can additionally enumerate all paths that start at $π_a$ and end at $π_b$, and can take disjunctions of the transitions represented by each path. A challenge may arise, however, when enumerating the paths that start at $π_a$ and end at $π_b$ due to existence of nested loops. Referring briefly to FIG. 3, a representation 300 of operation of the splitter component 202 is shown, where the splitter component 202 splits the control location π into two locations $π_a$ and $π_b$.

Returning to FIG. 2, the transition system generator component 106 additionally includes a closure determiner component 204 that computes a transitive closure of a transition system of at least one nested loop that lies between locations $π_a$ and $π_b$. Computation of a transitive closure will now be described in greater detail. $T'(\vec{x},\vec{x}')$ is a transitive closure of a transition system $T(\vec{x},\vec{x}')$ if Id⇒T' and T'•T⇒T'. Generating a transitive closure of a transition system is similar to computing invariants for a loop representing the transition system. While the below-described technique for computing transitive closure of a transition system is described in connection with computing reachability bounds (or bound analysis in general), it is to be understood that the technique may be applied to other applications, including but not limited to testing safety properties of programs to be executed by computing devices.

An algorithm utilized by the closure determiner component 204 can be based at least in part upon a convexity-like assumption. A theory is said to be convex if and only if for every quantifier-free formula φ in that theory, if φ implies a disjunction of equalities, then it implies one of those equalities, e.g.,:

$$(\phi \Rightarrow (V_i(x_i=y_i))) \Rightarrow (V_i(\phi \Rightarrow (x_i=y_i)))$$

If $V_{j=1}^m s'_k$ is a transitive closure of $V_{i=1}^n s_i$, then from the definition of transitive closure it follows that for all i∈ {1, . . . , n} and j∈{1, . . . , m}, the following holds:

$$Id \Rightarrow V_{k=1}^1 s'_k \text{ and } s'_j \circ s_i \Rightarrow V_{k=1}^m s'_k$$

After distribution implication over disjunctions in the above equations, the convexity-like assumption can be obtained, which can be defined as follows: $T'=V_{j=1}^m s'_j(\vec{x},\vec{x}')$ can be a transitive closure for a transition-system $T=V_{i=1}^n s_i(\vec{x},\vec{x}')$ where each $s_i$ and $s'_j$ is a conjunctive relation. The transitive closure $V_j s'_j$ satisfies the convexity-like assumption of there exists an integer δ∈{1, . . . , m}, a map σ: {1, . . . , m}×{1, . . . , n} ↦ {1, . . . , m} such that for all i∈{1, . . . , n} and j∈{1, . . . , m}, the following holds:

$$Id \Rightarrow s'_\delta \text{ and } (s'_j \circ s_i) \Rightarrow s'_{\sigma(j,i)}$$

The tuple (δ,σ) can be referred to as the convexity-witness of $V_{j=1}^m s'_j$. The convexity-like assumption implies that no case-split reasoning is needed to prove inductiveness of transitive closure.

Given the convexity-witness (δ,σ) of any transitive-closure T' (that satisfies the convexity-like assumption) of a transition system T, the algorithm below can be utilized by the closure determiner component 204 to compute a transitive closure that is at least as precise as T'.

---
Transitive closure $(V_{i-1}^n s_i)$ 1  for j ∈ {1, ... , m} − {δ}: $s'_j$ := false;
2  $s'_\delta$ := Id;
3  do {
4    for i ∈ {1, ... , n} and j ∈{1, ... , m}:
5      $s'_{\sigma(j,i)}$ := Join($s'_{\sigma(j,i)}, s'_j \circ s_i$)
6  } while any change in $V_{j-1}^m s'_j$
7  return $V_{j-1}^m s'_j$
---

The above algorithm performs abstract interpretation over the power-set extension of an underlying abstract domain, where elements are restricted to at most m disjuncts. The algorithm uses the map σ to determine how to merge the n×m different disjuncts (into m disjuncts) that are obtained after propagation of m disjuncts across n transitions.

The above algorithm, when executed by the closure determiner component, may not terminate when computing a Join over domains with infinite height. In an example, a Widen operator can be utilized in plate of the Join operator, for instance, after every threshold number of iterations (e.g., three). Furthermore, the convexity-witness (δ,σ) is unknown up front. Therefore, in an example, all possible (δ,σ) can be enumerated for a specifically chosen m. There may be $m^{mn}$ such possible maps since without loss of generality, it can be assumed that δ is 1. If m and n are relatively small constants such as two, then sixteen possibilities exist. Each selection for σ and δ can result in some transitive closure computation by the above algorithm. The closure determiner component 204 may then select the strongest transitive closure among the various transitive closures thus obtained. In another example, the closure determiner component 204 may heuristically select between incomparable transitive closures.

Additionally or alternatively, the closure determiner component 204 may utilize heuristics to construct m, δ, and σ. For example, the closure determiner component 204 may utilize the following heuristic to construct m, δ, and σ. m can be set at n+1, and δ can be set to m, and the map σ can be selected from a directed acyclic graph (DAG) of dependencies between transitions of the transition system T generated from a bound computation of T (as will be described in detail below). In particular, for any $i,j \in \{1, \ldots, n\}$, σ(n+1,i):=i,σ(i, i):=i, and σ(i,j):=i except when $NI(s_j, s_i, r)$ (where r∈RankC ($s_i$) is a ranking function that contributed to the bound computation of T as described below) in which case σ(i,j):=j. Such a choice of the map δ and σ can generate a transitive closure that would allow for computing the bound of T∘TransitiveClosure(T), where TransitiveClosure(T) is an algorithm for computing the transitive closure of a transitive system, such as the algorithm shown above. Such a transitive closure preserves important relationships between program variables that can be employed, for instance, by the bound computation component 108 (FIG. 1).

Figure 4:
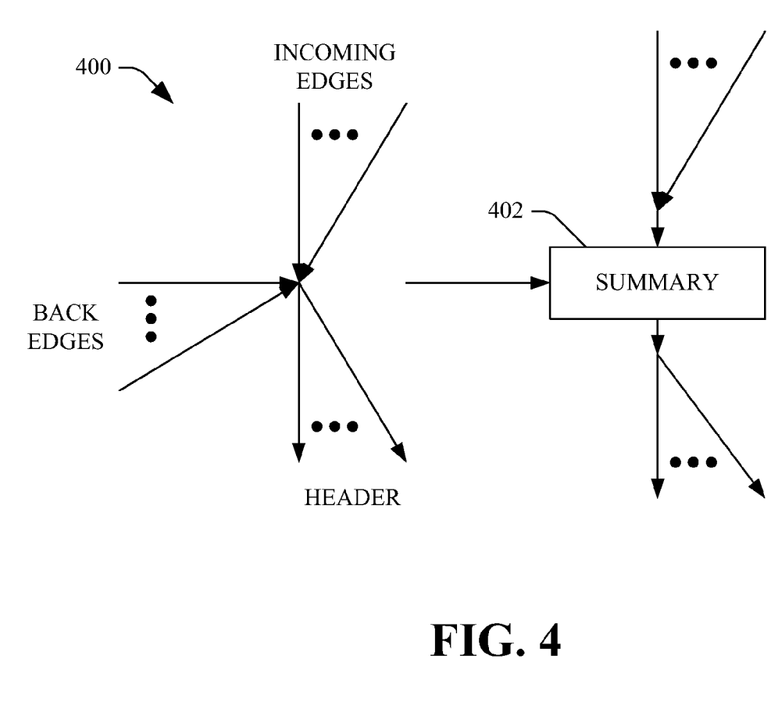
FIG. 4 is a graphical depiction of a summarization of a nested loop.

The system 200 further includes a summarizer component 206 that is configured to replace nested loops between locations $\pi_a$ and $\pi_b$ with the transitive closure of the transition-system of the nested loop (as determined by the closure determiner component 204). Referring briefly to FIG. 4, an example depiction 400 of operation of the summarizer component 206 is illustrated. As indicated above, a summary 402 is a replacement of at least one nested loop.

Pursuant to an example, the following algorithm may be utilized by the transition system generator component 104 to generate a transition system, wherein such algorithm can be a function GenerateTransitionSystem(π):

```
1    π_a, π_b := Split(π);
2    foreach top-level loop L:
3        π_L := location before header of L;
4        T := GenerateTransitionSystem(π_L);
5        T_c := TransitiveClosure(T);
6        Insert Summary T_c before header; Remove back-edges.
7    Initialize F[π_a] to the transition system Id.
8    Propagate translations F using Merge/Compose rules.
9    return F[π_b]
```

Again, this algorithm can be utilized by the transition system generator component 106 for the control location π. The algorithm is described at a flow-graph level, and an assumption can be made that flowgraphs are reducible but not necessarily structured. It is to be understood, however, that the algorithm can be extended to irreducible flowgraphs.

Line 1 transforms the flowgraph by splitting the input control location π into two locations $\pi_a$ and $\pi_b$. As described above, the splitter component 202 can perform such split, and the result of the split is shown in FIG. 3. Line 2 iterates over each top-level loop L in the transformed flowgraph (any graph can be decomposed into a DAG of maximal strongly-connected components). Line 3 makes use of the fact that every loop in a reducible flowgraph has a unique header node. Line 4 recursively generates the transition system for the loop L in the transformed flowgraph. Line 5 generates the transitive closure for the transition system for the loop L, wherein the closure determiner component 204 can generate such transitive closure. Line 6 replaces the loop L by its summary obtained by generating a transitive closure of the transition-system represented by the transitive closure. As indicated above, the summarizer component 206 can undertake such replacement through actions shown in FIG. 4. The effect of the foreach loop in line 2 is to replace all loops on the paths between $\pi_a$ and $\pi_b$ by (disjunctive) loop-free abstract code fragments. The transition system can be generated by enumerating all paths (which are now finite in number) between $\pi_a$ and $\pi_b$.

Figure 5:
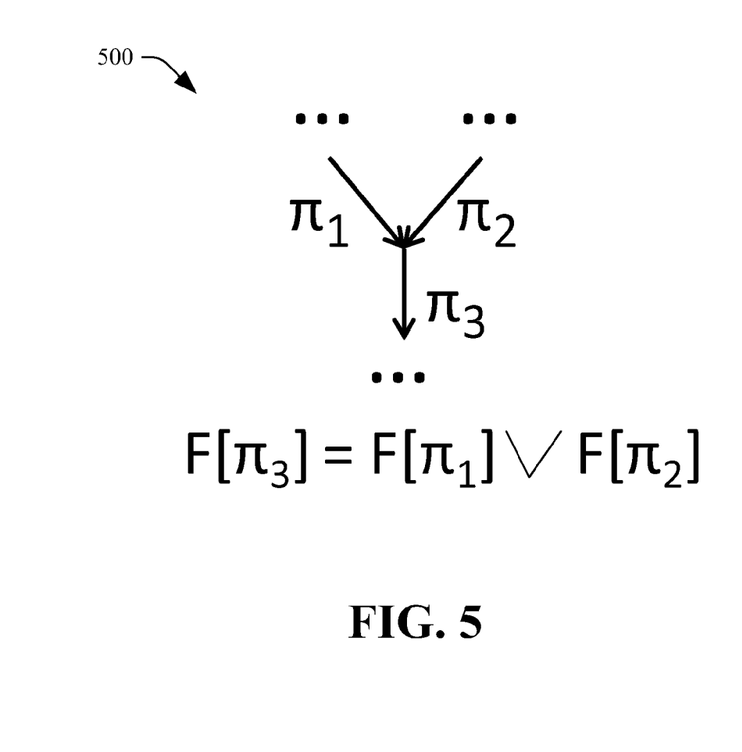
FIG. 5 is a graphical depiction of an example composition.
Figure 6:
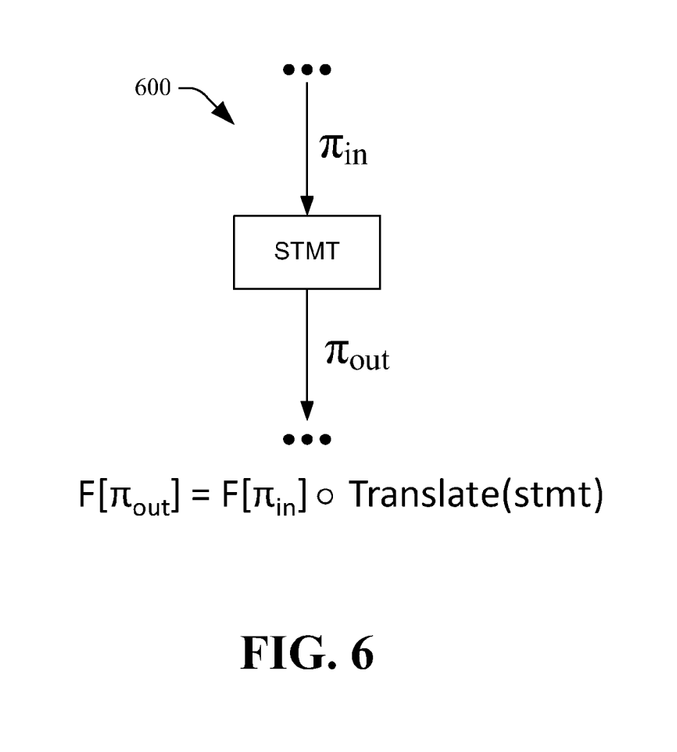
FIG. 6 is a graphical depiction of an example merging operation.

Lines 7-9 generate the transition-system for an acyclic flowgraph by simple forward dataflow analysis that associates a (disjunctive) transition system F[π] with each edge/control location π in the transformed flowgraph. For this purpose, the entry location $\pi_a$ can be associated with the transition system consisting of a single transition Id, which is the identity mapping between the variables and their primed versions. Without loss of generality, it can be assumed that all conditional guards have been translated into Assume statements. The merge transfer function returns the disjunctions of the transitions in the two input transition systems. A merger component 208 can perform such merging, and an example graphical illustration 500 of operation of the merger component 208 is shown in FIG. 5. The compose transfer function makes use of the compose operator ∘ that returns the composition of two transitions. The composer component 210 can perform such composition, and an example graphical illustration 600 of operation of the composer component 210 is shown in FIG. 6.

Composition of transition systems output by the composer component 210 can be defined as follows: the binary composition of two transition systems $T(\vec{x},\vec{x}')=V_i s_i$ and $T'(\vec{x},\vec{x}')=V_j s'_j$, denoted by T∘T', is $V_{i,j} s_i \circ s'_j$, where $s_i \circ s'_j$ denotes the following transition: $s_i(\vec{x},\vec{x}') \circ s'_j(\vec{x},\vec{x}') \stackrel{\text{def}}{=} \exists \vec{x}''(s_i[\vec{x}''/\vec{x}'] \wedge s'_j[\vec{x}''/\vec{x}])$, where $s_i[\vec{x}''/\vec{x}]$ denotes the substitution of $\vec{x}'$ by $\vec{x}''$ in $s_i$.

Figure 7:
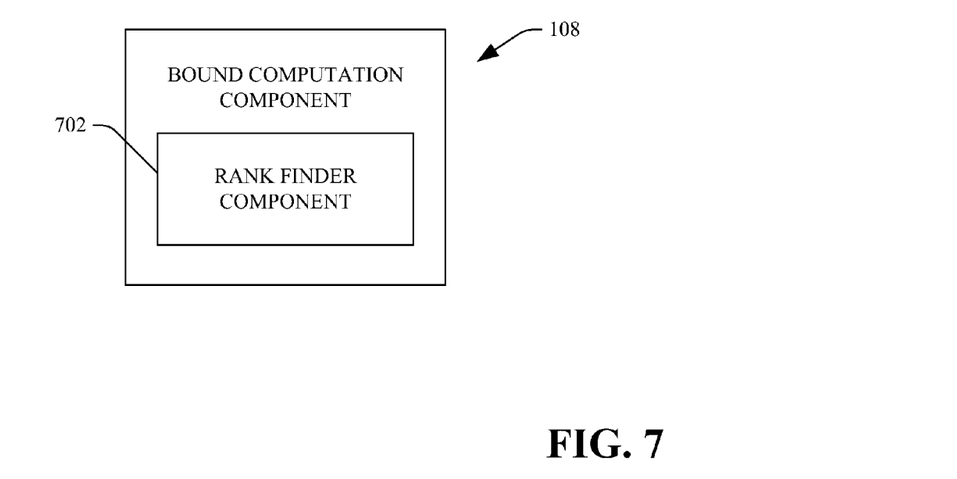
FIG. 7 is an example depiction of a component that facilitates computing a bound based at least in part upon a transition system pertaining to a control location of a procedure.

The transition system generator component 106 may also utilize a Translate function that converts a statement into a transition-system. Such a function may act as follows: it can be assumed that the only assignment statement is of the form x:=e since memory can be modeled using Select and Update expressions. The other kinds of statements can be either an Assume statement (obtained from the conditional guards) or Summary statement (obtained from summarization of nested loops):

Translate(x:=e)=(x'=e)∧ ($\wedge_{y \neq x} y'=y$)
Translate(Assume(guard))=Id∧ guard
Translate(Summary(T))=T Now referring to FIG. 7, a detailed depiction of the bound computation component 108 is illustrated. As indicated above, the bound computation component 108 can compute a bound for the transition system T. If a transition-system consists of a single transition s, then the bound computation component 108 can compute a bound for the transition system from a ranking function r of the transition s.

Theorem 1: If there exists a ranking function r for a transition s, then the number of iterations of s is bounded above by Max(0,r).

Proof: If the transition s is ever taken, then r denotes an upper bound on the number of iterations of s (since, by definition of a ranking function, transition s implies that r is lower bounded by zero and decreases by at least one in each iteration). The other case is when s is never executed (i.e., the number of iterations of s is zero). Combining such two cases provides the result shown in Theorem 1.

Any suitable ranking function can be employed, and any suitable manner for computing a ranking function can be utilized. Example approaches for computing ranking functions are described in greater detail below. Computing a bound for a transition-system that includes multiple transitions is somewhat more complex than computing a bound for a transition-system that includes a single transition. For instance, the bound computation component 108 cannot add ranking functions of individual transitions to compute the bound for the transition-system, since the interleaving of such transitions with each other can invalidate the decreasing measure of the ranking function. Another approach can be to define the notion of lexicographic ranking functions or disjunctively well-founded ranking functions for transition-systems consisting of multiple transitions.

The bound computation component 108 can include a rank finder component 702, which be employed to compute one or more ranking functions. Example techniques for computing ranking functions are described herein. It is to be understood, however, that any suitable ranking function may be employed by the bound computation component 108 in connection with computing a bound pertaining to a transition-system. For example, the rank finder component 702 can generate a ranking function using arithmetic iteration patterns, list iterations patterns, etc. Additionally, ranking functions computed by the rank finder component 702 may be utilized outside of the context of computing reachability bounds.

As used herein, a ranking function for a transition can be defined as follows: a real-valued function $r(\vec{x})$ is a ranking function for a transition $s(\vec{x}, \vec{x}')$ if it is lower bounded by zero and if it decreases by at least one in each execution of the transition: e.g.:

$$s \Rightarrow (r>0)$$

$$s \Rightarrow (r[\vec{x}'/\vec{x}] \le r-1)$$

This can be denoted by Rank (s,r).

A ranking function $r_1(\vec{x})$ may be deemed more precise than a ranking function $r_2(\vec{x})$ if $r_1(\vec{x}) \le r_2(\vec{x})$ (because in such a case $r_1$ provides a more precise bound for the transition than $r_2$.

The rank finder component 702 may utilize a RankC function that takes as input a transition $s(\vec{x}, \vec{x}')$ and outputs a set of ranking functions $r(\vec{x})$ for that transition. Additionally, the rank finder component 702 may use one or more pattern-matching-based techniques that rely on making some queries that can be discharged using an SMT solver. Other techniques, such as constraint-based techniques or iterative fixed-point computation based-techniques can also be utilized for generating ranking functions.

Example patterns that can be utilized by the rank finder component 702 to output ranking functions are described herein. A first set of example patterns include arithmetic iteration patterns. One standard manner to iterate over loops is to use an arithmetic counter. Ranking functions for such an iteration pattern can be computed using the following pattern:

If $s \Rightarrow (e>0 \wedge e[\vec{x}'/\vec{x}]<e)$, then $e \in \text{RankC}(s)$.

The candidates for expression e while applying the above pattern are restricted to expressions that only involve variables from $\vec{x}$ and those that occur syntactically as an operand of conditionals when normalized to the form (e>0), after rewriting a conditional of the form $(e_1 > e_2)$ to $(e_1 - e_2 > 0)$. The following are some example transitions whose ranking functions can be computed using an application of this pattern:

RankC$(i'=i+1 \wedge i<n \wedge i<m \wedge n'=n \wedge m' \le m)$= $\{n-i, m-i\}$;

RankC$(n>0 \wedge n' \le n \wedge A[n] \ne A[n'])=\{n\}$

The second example transition above is an illustration of how simple pattern matching can be employed by the rank finder component 702 to guess a ranking function, and an SMT solver (that can reason about combination of theory of linear arithmetic and theory of arrays) can be used to perform the relatively complicated reasoning of verifying the ranking function over loop-free code fragment.

Another arithmetic pattern is the use of a multiplicative counter whose value doubles or halves in each iteration (as in case of binary search). A more precise ranking function for such a transition can be computed using the pattern below:

If $s \Rightarrow (e \ge 1 \wedge e[\vec{x}'/\vec{x}] \le e/2)$, then log $e \in \text{RankC}(s)$ The candidates for expression e while applying the above pattern are restricted to those expressions that only involve variables from $\vec{x}$ and those that occur syntactically as an operand of conditionals when normalized to the form (e>1), after rewriting a conditional of the form $(e_1 > e_2)$ that occurs in s to $$\left(\frac{e_1}{e_2} > 1\right),$$

provided $e_2$ is known to be positive. The following are additional transitions whose ranking functions can be computed using an application of this pattern:

$$\text{RankC}\left(i' \le \frac{i}{2} \wedge i > 1\right) = \{\log i\}$$

$$\text{RackC}(i' = 2 \times i \wedge i > 0 \wedge n > i \wedge n' = n) = \{\log(n/i)\}$$

These two patterns can be utilized by the rank finder component 702 to compute ranking functions for loops that iterate using arithmetic counters. If pattern matching is not sufficient for a particular case, then other methods can be used, such as counter instrumentation and invariant generation techniques, some of which are described in "A Numerical Abstract Domain Based on Expression Abstraction and Max Operator with Application in Timing Analysis", by Gulavani and Gulwani, in CAV, pages 370-384, published in 2008, the entirety of which is incorporated herein by reference.

In another example, the rank finder component 702 may use Boolean iteration patterns to compute ranking functions. Often loops contain a path/transition that is meant to execute a single time. The purpose of such a transition is to switch between different phases of a loop or to perform the cleanup action immediately prior to loop termination. Such an iteration pattern can be captured by the following rule/lemma, where the operator Bool2Int(e) maps Boolean values true and false to 1 and 0, respectively.

If $s \Rightarrow (e \wedge not(e[\vec{x}'/\vec{x}]))$, then Bool2Int(e) $\in$ RankC(s)

The candidates for Boolean expression e while applying the above pattern may be restricted to expressions that only involve variables from $\vec{x}$ and those that occur syntactically in the transition s. Below are some example transitions whose ranking functions can be computed by the rank finder component 702 using an application of this pattern.

RankC(flag'=false $\wedge$ flag)={Bool2Int(flag)}

RankC(x'=100 $\wedge$ x<100)={Bool2Int(x<100)}

In yet another example, the rank finder component 702 may use bit-vector iteration patterns in connection with computing ranking functions. An example manner of iterating over a bit-vector is to alter the position of the least significant one bit (or most significant one bit). Such an iteration pattern can be captured by the following rule/lemma, where the function LSB(x) denotes the position of the least significant 1-bit, counting from 1, and starting from the most-significant bit position. LSB(x) can be defined to be zero if there is no 1-bit in x. Additionally, LSB(x) can be bounded above by the total number of bits in bit-vector x.

If $s \Rightarrow (\text{LSB}(x') < \text{LSB}(x) \land x \neq 0)$,
then $\text{LSB}(x) \in \text{Rank}C(s)$ The candidates for variable x while applying such pattern can be bit-vector variables that occur in the transition s. The query in the above pattern can be discharged using an SMT solver that provides support for bit-vector reasoning, and, in particular, the LSB operator (if the SMT solver does not provide first-class support for the LSB operator, then the LSB operator can be encoded using bit-level manipulation). The following two example transitions can have a bound computed using the above rule:

$\text{Rank}C(x' = x << 1 \land x \neq 0) = \{\text{LSB}(x)\}$ $\text{Rank}C(x' = x \& (x-1) \land x \neq 0) = \{\text{LSB}(x)\}$ In still yet another example, the rank finder component 702 can compute a ranking function through utilization of data structure iteration patterns. Iteration over data structures or collections is common, and one example manner to iterate over a data structure is to follow field dereferences until some designated object is reached. Such an iteration pattern can be captured by the following rule/lemma, where the function Dist (x,z,f) denotes the number of field dereferences along field f needed to reach z from x:

If $s \Rightarrow (x \neq z \land (\text{Dist}(x',z,f) < \text{Dist}(x,z,f)))$, then $\text{Dist}(x,z,f)$
$\in \text{Rank}C(s)$ The candidates for variables x, z, and field f while applying the above pattern are variables $\vec{x}$ and field names that occur in s. The query in the above pattern can be discharged using an SMT solver that implements a decision procedure for the theory of reachability and can reason about its cardinalities. It can be noted that Dist (x,z,f) denotes the cardinality of the set of nodes that are reachable from x before reaching z along field f. Below are example transitions whose ranking functions can be computed using an application of this pattern:

$\text{Rank}C(x \neq \text{Null} \land x' = x.\text{next}) = \{\text{Dist}(x, \text{Null}, \text{next})\}$ $\text{Rank}C(\text{Mem}' = \text{Update}(\text{Mem}, x.\text{next}, x.\text{next.next})$
$\land x \neq \text{Null} \land x.\text{next} \neq \text{Null}) = \{\text{Dist}(x, \text{Null}, \text{next})\}$ As indicated above, the bound computation component 108 can compute a bound for a transition system based at least in part upon a ranking function of the transition system computed by the rank finder component 702. In an example, the bound computation component 108 can utilize a max composition of ranking functions approach to compute a bound for the transition system T. For instance, the bound for a transition-system that comprises of two transitions $s_1$ and $s_2$ can be obtained by applying the Max operator to the ranking functions for the individual transitions when the transitions are either disjoint or they decrease the ranking function of the other. More formally, there is a cooperative interference between transitions $s_1$ and $s_2$ through their respective ranking functions $r_1$ and $r_2$ if either of the following conditions hold:
(1) $s_1 \circ s_2 = \text{false}$ (non-enabling condition); and (2) $s_1 \Rightarrow r_2[\vec{x}'/\vec{x}] \leq \text{Max}(r_1, r_2) - 1$ (rank-decrease condition). This cooperative interference can be denoted by $\text{CI}(s_1, r_1, s_2, r_2)$.

Theorem 2 Given $r_1 \in \text{Rank}C(s_1)$ and $r_2 \in \text{Rank}C(s_2)$, if $\text{CI}(s_1, r_1, s_2, r_2) \land \text{CI}(s_2, r_2, s_1, r_1)$, then Bound $(s_1 \lor s_2) = \text{Max}(0, r_1, r_2)$ Proof: Four cases can be considered: (1) If both transitions $s_1$ and $s_2$ satisfy the non-enabling condition, then either only transition $s_1$ can execute or only transition $s_2$ can execute; (2) If both transitions satisfy the rank-decrease condition, then it can be shown that $\text{Max}(r_1, r_2)$ is a ranking function for both the transitions $s_1$ and $s_2$; (3) if transition $s_1$ satisfies the non-enabling condition while transition $s_2$ satisfies the rank-decrease condition, then the only possibility is that a sequence of transitions $s_2$ is followed by a sequence of transitions $s_1$. The result now follows from the fact that $\text{Max}(r_1, r_2)$ is a ranking function for $s_2$, while $r_1$ is a ranking function for $s_1$; (4) the last case is similar to (3). Therefore, the bounds for transitions can be composed using a Max operator if the transitions satisfy the cooperative interference conditions.

In another example, the bound computation component 108 can compute a bound for a transition system that comprises two transitions $s_1 \lor s_2$ by adding together the ranking functions for the two transitions under cases when a transition does not interfere with the ranking functions of the other transition. Non-interference of a transition with respect to a ranking function of another transition can be defined as follows: a transition $s_1$ does not interfere with the ranking function of another transition $s_2$ if one of the following conditions holds: (1) $s_1 \circ s_2 = \text{false}$ (non-enabling condition); or (2) $s_1 \Rightarrow (r_2[\vec{x}'/\vec{x}] \leq r_2)$ (rank-preserving condition). Such non-interference can be denoted by $\text{NI}(s_1, s_2, r_2)$. Given the above, the following theorem holds, where the notation Iter(s) denotes the total number of iterations of transition s inside its transition system:

Theorem 3: Given $r_1 \in \text{Rank}C(s_1)$, $r_2 \in \text{Rank}C(s_2)$, if $\text{NI}(s_1, s_2, r_2) \land \text{NI}(s_2, s_1, r_1)$, then $\text{Bound}(s_1 V s_2) = \text{Iter}(s_1) + \text{Iter}(s_2)$, where $\text{Iter}(s_1) = \text{Max}(0, r_1)$ $\text{Iter}(s_2) = \text{Max}(0, r_2)$ Proof: The non-interference condition $\text{NI}(s_2, s_1, r_1)$ ensure that the value of the ranking function $r_1$ for transition $s_1$ is not increased by any interleaving of transition $s_2$. Thus, a total number of iterations of the transition $s_1$ is given by $\text{Max}(0, r_1)$. Similarly, the total number of iterations of the transition $s_2$ is given by $\text{Max}(0, r_2)$. Therefore, bounds for transitions can be composed using the Addition operator if the transitions satisfy the non-interference conditions.

In another example, the bound computation component 108 can compute bounds by way of multiplicative composition of ranking functions computed by the rank finder component 702. For instance, if mutual cooperative-interference or mutual non-interference of two transitions cannot be established, then the bound computation component 108 can compute a bound so long as at least one of the transitions satisfies the non-interference property described above. The bound in such a case can be computed by multiplying together the ranking functions for the two transitions. Such multiplication can be made precise as shown in the following theorem. This is a relatively common case for bounding iterations of an inner loop when its iterators are reinitialized inside the outer loop leading to a multiplicative bound.

Theorem 4: Given $r_1 \in RankC(s_1)$ and $r_2 \in RankC(s_2)$, if $NI(s_2, s_1, r_1)$, then $$Bound(s_1 \vee s_2) = Iter(s_1) + Iter(s_2), \text{ where}$$

$$Iter(s_1) = Max(0, r_1);$$

$$Iter(s_2) = Max(0, r_2) + Max(0, u_2) \times factor;$$

where factor=Max(0, $r_1$) and $u_2(\vec{x})$ denotes an upper bound on expression $r_2(\vec{x}')$ in terms of $\vec{x}$ as implied by TC ($s_1$). For the special case where $(r_1 > 0) \wedge s_2$ is unsatisfiable, the factor can be set to one.

Proof: From the non-interference condition $NI(s_2, s_1, r_1)$, it can be concluded that $Iter(s_1) \leq Max(0, r_1)$. However, this does not hold for $s_2$. Instead it can be observed that the maximum number of iterations of $s_2$ in between any two interleavings of $s_1$ is bounded above by $Max(0, u_2)$ (since the starting value of the ranking function $r_2$ is reset to $u_2$ by any execution of $s_1$). The number of iterations of $s_2$ before any interleaving of $s_1$ is still bounded by $Max(0, r_2)$. Thus, the total number of iterations of $s_2$ is bounded by $Max(0, r_2) + Max(0, u_2) \times Max(0, r_1)$. The special case follows from the observation that even though $s_1$ interferes with the ranking function $r_2$ of $s_2$, it can interfere at most once since $s_1$ is enabled only after completion of all iterations of $s_1$. In other words, the worst-case possibility is a sequence of transitions $s_2$ followed by a sequence of transitions $s_1$ followed by a sequence of transitions $s_2$. Therefore, the bounds for transitions can be composed using a Multiplication operator if one of the transitions satisfies the non-interference condition.

An example algorithm (referred to herein as the Compute-Bound algorithm) that can be executed by the bound computation component 108 in connection with computing a bound for a transition system is shown below.

| ComputeBound($V_{i=1}^n s_i$) |
| --- |

```
1    for i ∈ {1, ... , n}: Iter[s_i] := ⊥;
2    do {
3      for i ∈ {1, ... , n} and r ∈ RankC(s_i):
4        J := {j | ¬NI(s_j, s_i, r)};
5        if (Iter[s_i] = ⊥) ∧ (∀j ∈ J: Iter[s_j] ≠ ⊥)
6          factor := 0;
7          foreach j ∈ J: factor := factor + Max(0, r);
8          Let u(x̄) be an upper bound on r [x̄'/x̄] as implied by
             TC(V_{j≠i} s_j)
9          Iter[s_i] := Max(0, r) + Max(0, u) × factor;
10   } while any change in Iter array;
11   if (∀j ∈ {1, ... , n}: Iter[s_j] ≠ ⊥), return Σ_j Iter [s_j];
12   else return "Potentially Unbounded"
```

Thus, the bound computation component 108 can combine the composition rules discussed above for transition systems with more than two transitions. For instance, it can be ascertained that an optimal manner of applying the rules pertaining to Additive-Composition and Multiplicative-Composition (theorems 3 and 4, respectively) is to compute the total number of iterations for each transition individually and thereafter sum the results. The ComputeBound algorithm implements such a strategy based on an extension of Theorem 3 and Theorem 4 to the case when a transition system comprises more than two transitions. The algorithm iteratively computes an array her such that Iter[$s_i$] denotes a bound on a total number of iterations taken by the transition $s_i$ during any execution of the transition system $S_i \vee \ldots \vee s_n$. The array J at line 4 comprises indices of all transitions that interfere with the ranking function r of the transition $s_i$. If a bound on the total iterations of all such transitions is known (test on Line 5 of ComputeBound), then the iterations of 5, is computed using a generalization of Theorem 3 and Theorem 4 (Line 9 of ComputeBound). The bound computation component 108 can compute bound on the entire transition system by summing up bounds on the total number of iterations of the individual transitions (Line 11 of ComputeBound). While ComputeBound is shown to output a single bound, it is to be understood that the bound computation component 108 can utilize an algorithm that computes multiple bounds by relaxing the condition Iter[$s_i$]=⊥ in Line 5 of ComputeBound by associating a set of bounds with Iter[$s_i$](as opposed to a single bound).

Additionally, the ComputeBound algorithm can be extended, such that the extension takes advantage of the proof rule in Theorem 2. For example, RankC(s) can be extended for any transition s with Max(r,r'), where r ∈ RankC(s) and r'∈RankC(s') for some other transition s', provided Rank(s, Max(r,r')), before running the ComputeBound algorithm. This allows for an application of Theorem 3 to obtain an additive bound that is a constant factor of two away from what would have been obtainable from application of Theorem 2. Thus, the bounds for transitions can be composed using a combination of Max, Addition, and Multiplication operators.

Figure 8:
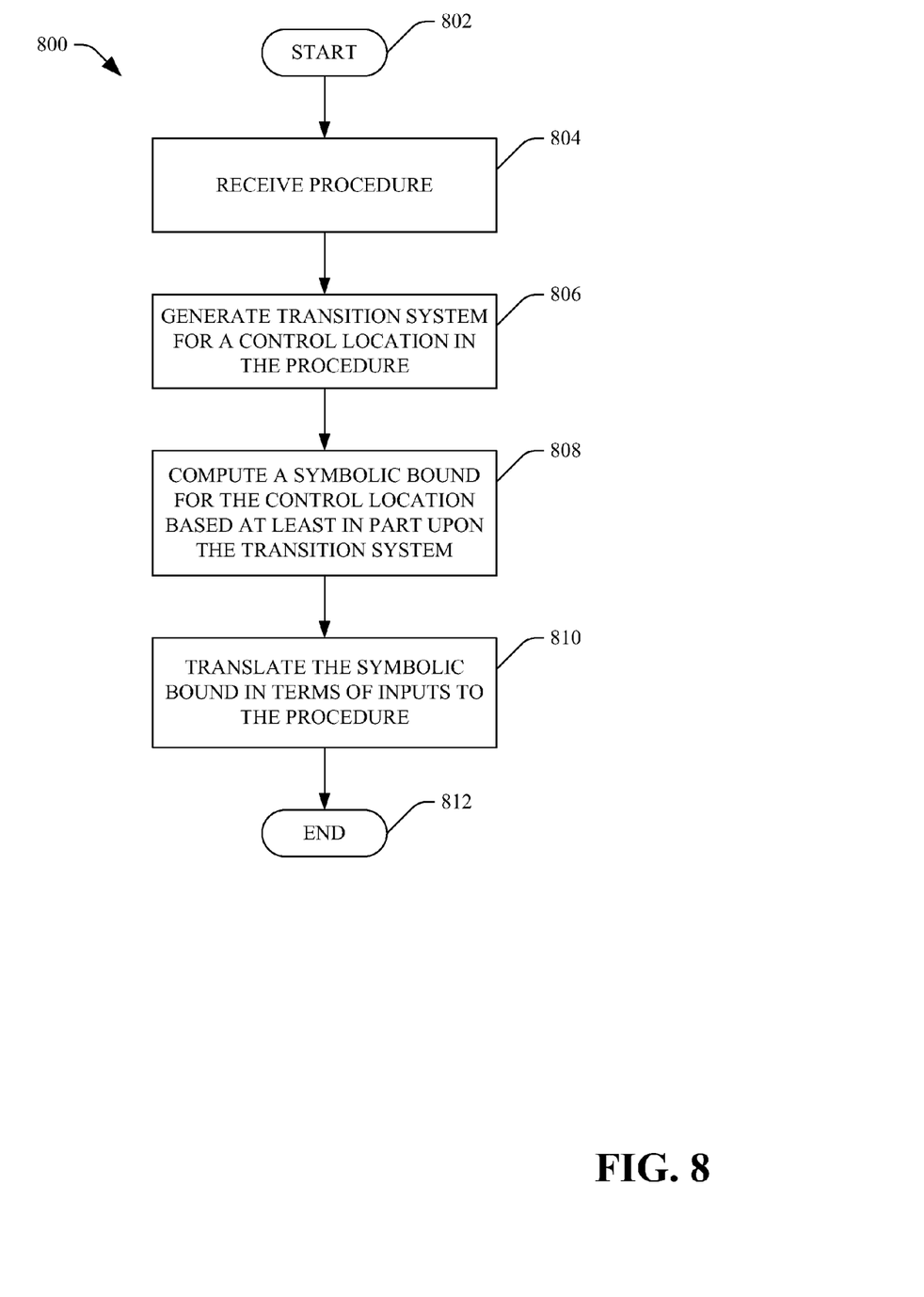
FIG. 8 is flow diagram that illustrates an example methodology for computing a reachability bound with respect to a control location of a procedure.
Figure 9:
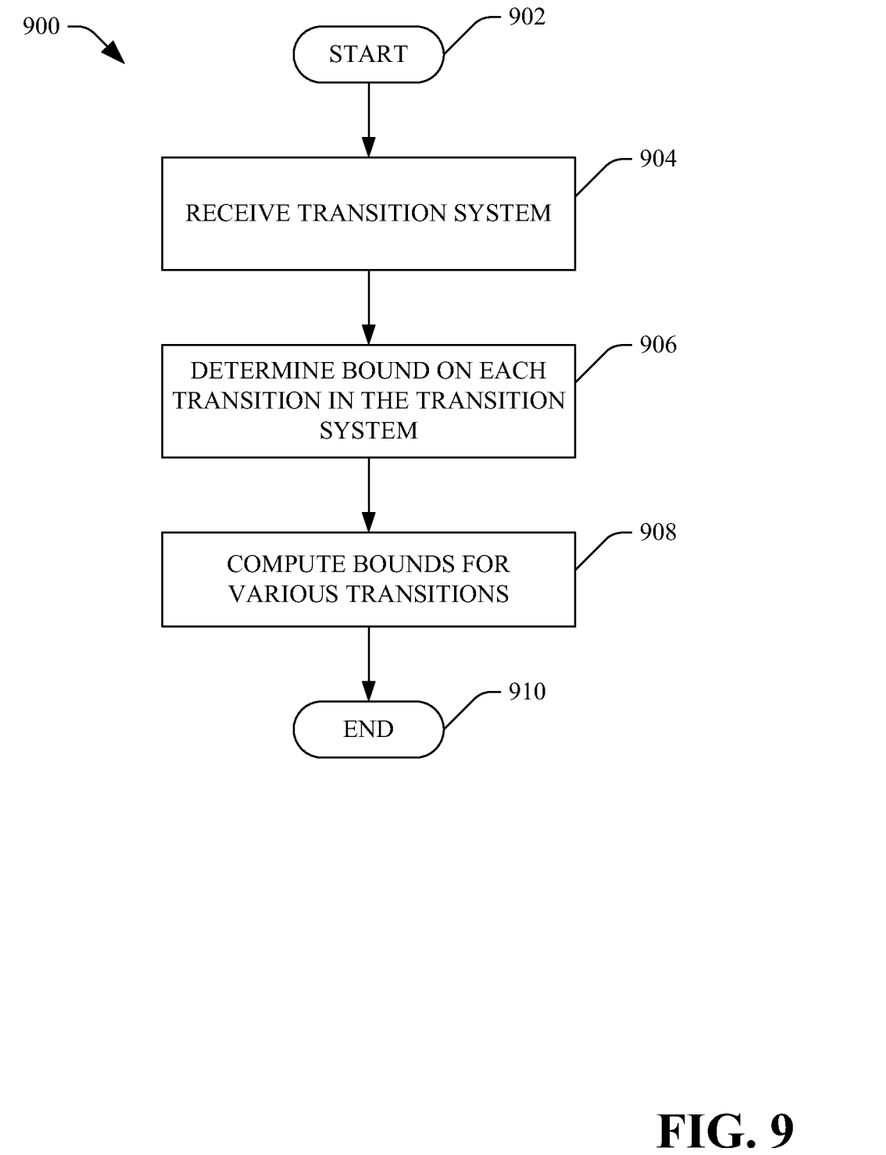
FIG. 9 is a flow diagram that illustrates an example methodology for computing a bound using a particular bound computing rule.

With reference now to FIGS. 8-9, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 8, a methodology 800 that facilitates computing a symbolic bound with respect to a control location in a procedure that is executable by a processor in a computing device is illustrated. The methodology 800 begins at 802, and at 804 a procedure is received. For instance, the procedure can be retained in a computer-readable medium, such as a hard drive, memory, or other suitable medium, and such medium can be accessed to retrieve the procedure. For example, the procedure may include one or more nested loops.

At 806, a transition system is generated with respect to a control location in the procedure. The control location can be automatically located or specified by an individual. Moreover, the transition system can include one or more transitions.

At 808, a symbolic bound is computed with respect to the transition system in terms of inputs to the transition system. For example, ranking functions for individual transitions can be computed (using, for example, pattern matching techniques) and then composed together in connection with computing the symbolic bound. At 810, the symbolic bound is translated such that the symbolic bound is in terms of inputs to the procedure. The methodology 800 completes at 812.

With reference now to FIG. 9, an example methodology 900 that facilitates computing a symbolic bound with respect to a control location in a procedure is illustrated. The methodology 900 starts at 902, and at 904 a transition system pertaining to the control location in the procedure is received. At 906, a bound on each transition in the transition system is determined. At 908, the bounds on each transition are composed together using Max, Addition, and Multiplication operators using theorems 2-4, such as done in the Compute-Bound algorithm. The methodology 900 completes at 910.

Figure 10:
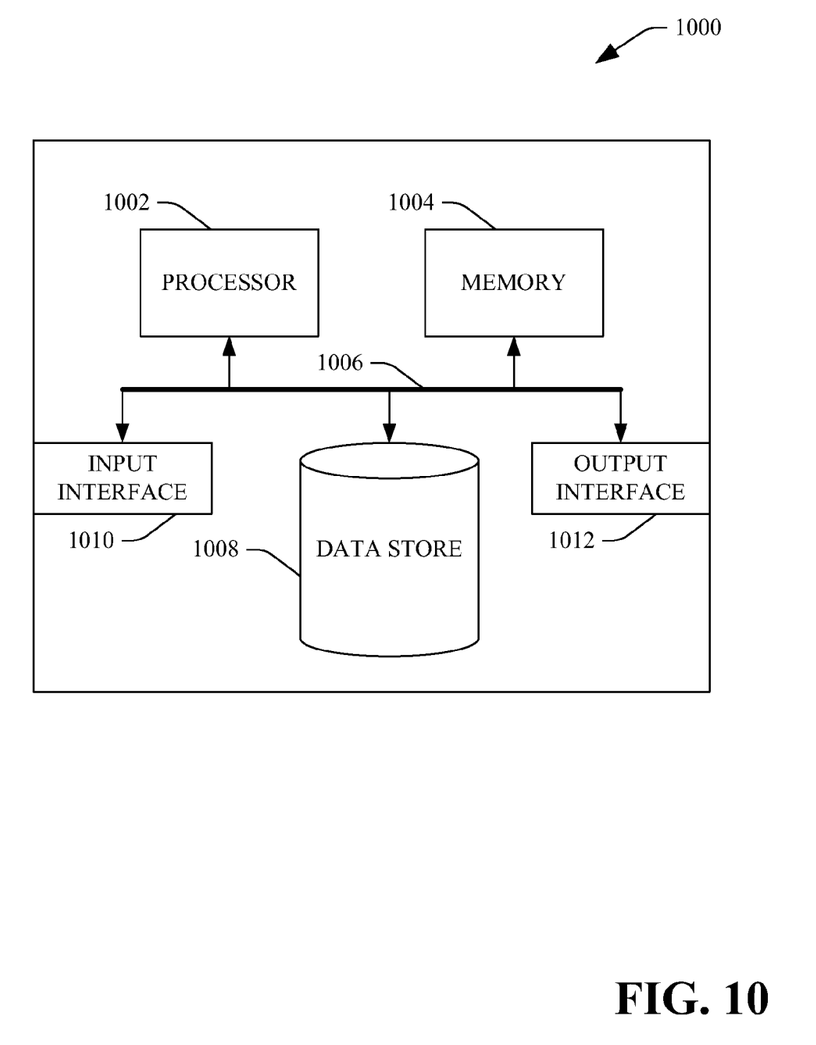
FIG. 10 is an example computing system.

Now referring to FIG. 10, a high-level illustration of an example computing device 1000 that can be used in accordance with the systems and methodologies disclosed herein is illustrated. For instance, the computing device 1000 may be used in a system that supports computing a symbolic bound with respect to a procedure. In another example, at least a portion of the computing device 1000 may be used in a system that supports computing a transition system with respect to a control location in a procedure. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store a transition system, one or more bound computation rules, etc.

The computing device 1000 additionally includes a data store 1008 that is accessible by the processor 1002 by way of the system bus 1006. The data store 1008 may include executable instructions, procedures, etc. The computing device 1000 also includes an input interface 1010 that allows external devices to communicate with the computing device 1000. For instance, the input interface 1010 may be used to receive instructions from an external computer device, from an individual, etc. The computing device 1000 also includes an output interface 1012 that interfaces the computing device 1000 with one or more external devices. For example, the computing device 1000 may display text, images, etc. by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1000.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A system that facilitates computing a symbolic bound on the number of visits to a control location inside a procedure, the system comprising:
a processor; and
a memory that comprises a plurality of components that are executed by the processor, the plurality of components comprising:
a transition system generator component that receives the procedure and computes a disjunctive transition system for the control location in the procedure, the disjunctive transition system, for each visit to the control location, indicating how variables in the procedure are updated when the control location is next visited;
a bound computation component that computes a bound for the transition system, wherein the bound is expressed in terms of inputs to the transition system; and
a translator component that translates the bound computed by the bound computation component such that the bound is expressed in terms of inputs to the procedure.

2. The system of claim 1, wherein the bound is computed with respect to a physical resource of a computing system.

3. The system of claim 2, wherein the physical resource is one of memory space allocated to the procedure when executing the procedure on the computing system, processing time utilized by the computing system when executing the procedure, power utilized by the computing system when executing the procedure, or bandwidth consumed when executing the procedure.

4. The system of claim 1, wherein the bound is computed with respect to at least one of perturbation of data corresponding to the procedure or secret leak corresponding to the procedure.

5. The system of claim 1, wherein the transition system generator component splits the control location into two locations $\pi_a$ and $\pi_b$, wherein $\pi_a$ is representative of an execution of the control location and $\pi_b$ is representative of an immediately next visit to the control location, wherein the transition system generator component enumerates paths that start at $\pi_a$ and end at $\pi_b$, and wherein the transition system generator component computes disjunctions of the transitions represented by each path.

6. The system of claim 5, wherein the transition system generator component recursively computes a transition system for each loop that lies between $\pi_a$ and $\pi_b$ in the procedure followed by computing a transitive closure for each loop that lies between $\pi_a$ and $\pi_b$ in the procedure.

7. The system of claim 6, wherein the transitive closure is generated using an abstract interpretation based technique relying on a convexity-like assumption to compute precise disjunctive invariants.

8. The system of claim 1, wherein the bound computation component computes the bound for the transition system based at least in part upon computing ranking functions for individual transitions.

9. The system of claim 8, wherein the bound computation component generates the ranking function based at least in part upon at least one pattern matching technique.

10. The system of claim 9, wherein the bound computation component generates the ranking function using one or more of bit-vector iteration patterns, arithmetic iterations patterns, list iteration patterns, or Boolean iteration patterns.

11. The system of claim 8, wherein the bound for the transition system is composed using at least one of the following:
a Max operator if the transitions satisfy cooperative interference conditions;
an Addition operator if the transitions satisfy non-interference conditions; or
a Multiplication operator if one or more of the transitions satisfies a non-interference condition.

12. The system of claim 8, wherein the bound for the transition system is composed using a combination of Max, Addition, and Multiplication operators.

13. The system of claim 1, wherein the translator component uses one or more of the following to relate inputs to the disjunctive transition system to inputs of the procedure:

invariants; or backward symbolic execution, wherein the backward symbolic execution uses proof-rule based non-iterative techniques to trace back across loops.

14. A method for computing a reachability bound on a control location inside a procedure that is executable by a processor in a computing device, wherein the method comprises:

accessing a computer-readable medium to retrieve the procedure;

generating a transition system with respect to the control location in the procedure, the transition system indicating, for each visit to the control location when the procedure is executed, how a variable is updated in an immediately subsequent visit to the control location when the procedure is executed;

computing a symbolic bound with respect to the control location, wherein the symbolic bound is expressed in terms of inputs to the transition system; and translating the symbolic bound into the reachability bound, wherein the reachability bound is expressed in terms of inputs to the procedure.

15. The method of claim 14, wherein the reachability bound is computed with respect to a physical resource of the computing device.

16. The method of claim 15, wherein the physical resource of the computing device is one of memory space allocated to the procedure when executing the procedure on the computing device, processing time utilized by the computing device when executing the procedure, power utilized by the computing device when executing the procedure, or bandwidth consumed when executing the procedure.

17. The method of claim 14, wherein computing the symbolic bound with respect to the control location comprises computing a ranking function for each transition in the transition system, and then composing the ranking functions using max, addition, or multiplication operators.

18. The method of claim 17, wherein pattern-matching techniques are utilized to compute the ranking function.

19. The method of claim 14, wherein the reachability bound is indicative of a number of times that the control location is visited during execution of the procedure.

20. A computer-readable memory comprising instructions that, when executed by a processor, cause the processor perform acts comprising:

accessing a data repository to retrieve a procedure;

generating a transition system with respect to a control location in the procedure, the transition system indicating, for each visit to the control location when the procedure is executed, how a variable is updated in an immediately subsequent visit to the control location when the procedure is executed;

computing a bound with respect to the control location, wherein the bound is expressed in terms of inputs to the transition system, wherein the bound is computed based at least in part upon a ranking function of each transition in the transition system, and wherein the ranking function is computed based at least in part upon pattern-matching techniques; and translating the bound into a reachability bound, wherein the reachability bound is expressed in terms of inputs to the procedure, and wherein the reachability bound is indicative of a number of visits to the control location when the procedure is executed.

\* \* \* \* \*